Aug. 26, 1924.  
F. R. McGEE  
VALVE  
Filed Jan. 31, 1924    6 Sheets-Sheet 5  
1,506,021
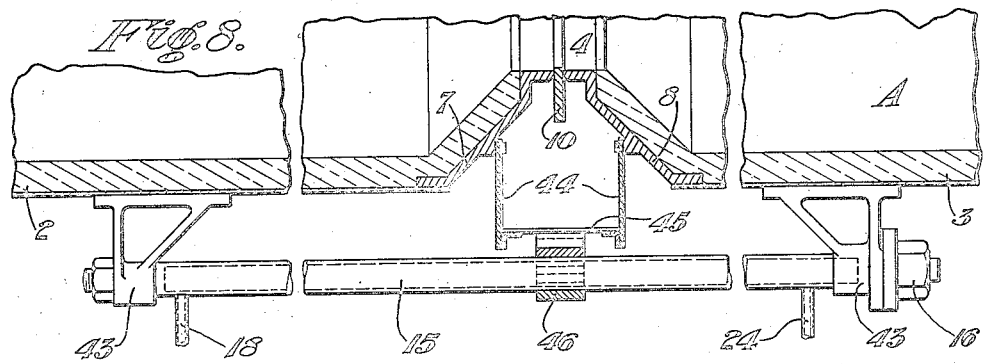
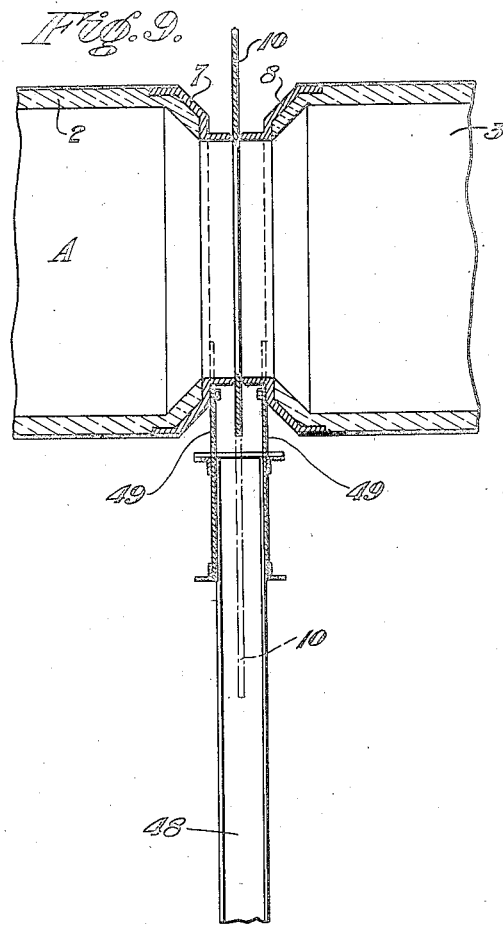
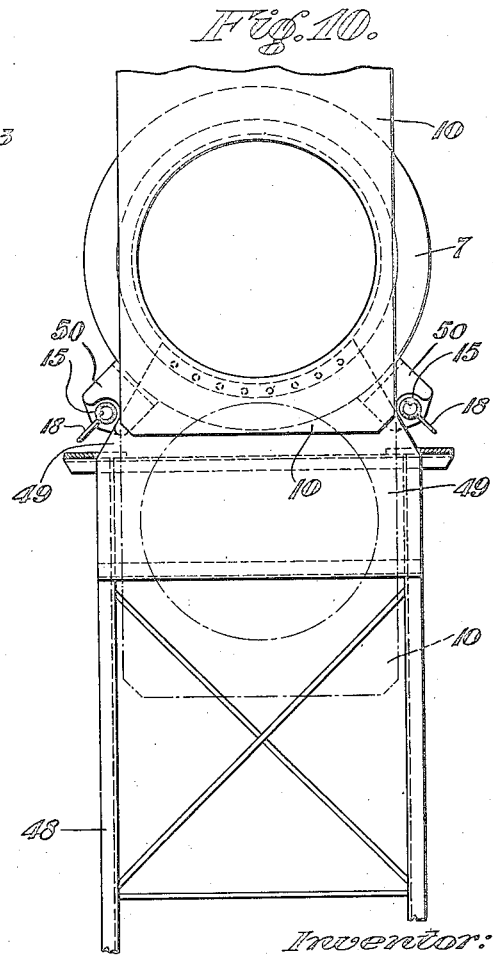
Witnesses:  
Edwin Trueb
Inventor:  
FRANK R. McGEE,  
by D. Anthony  
his Attorney.

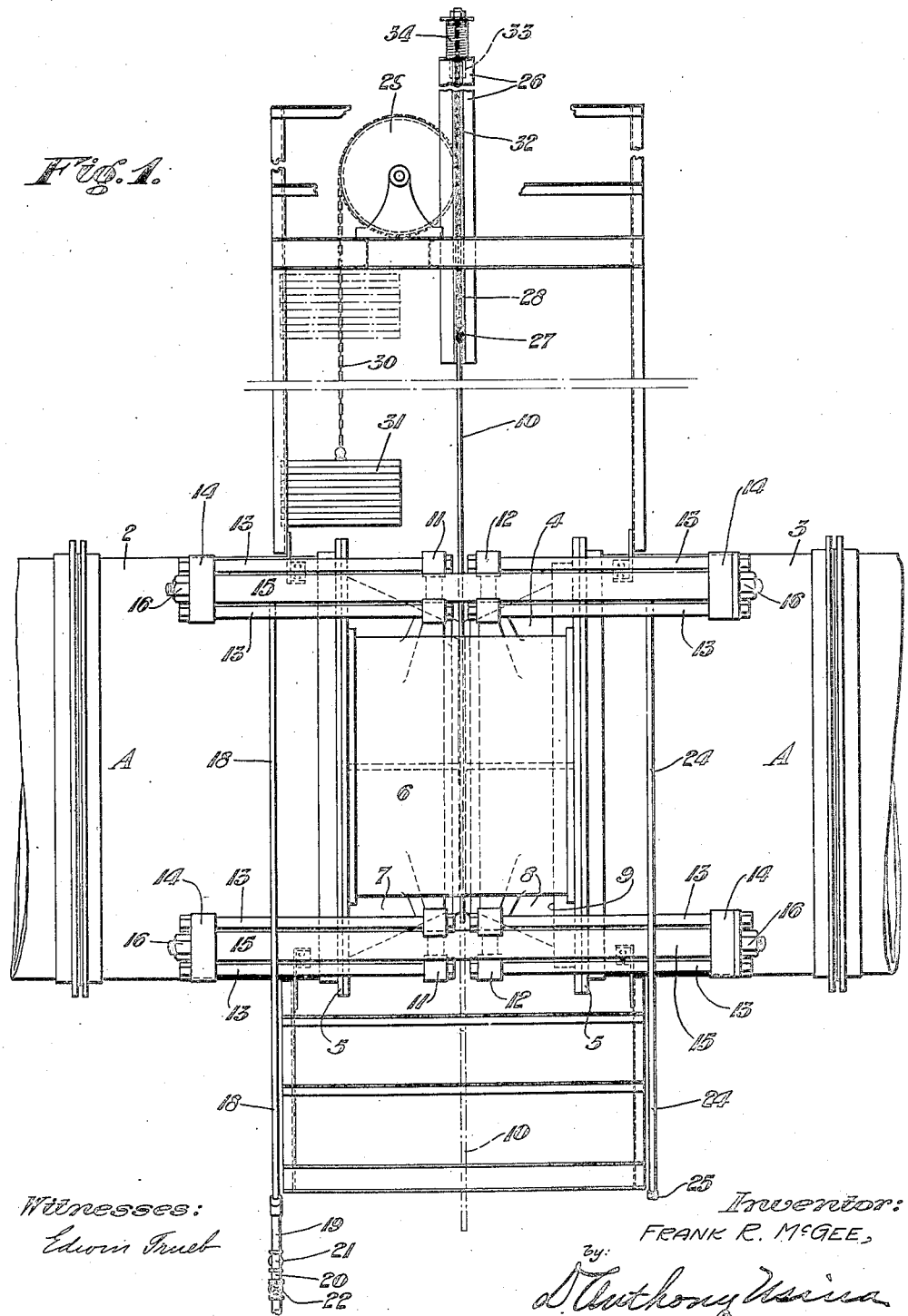

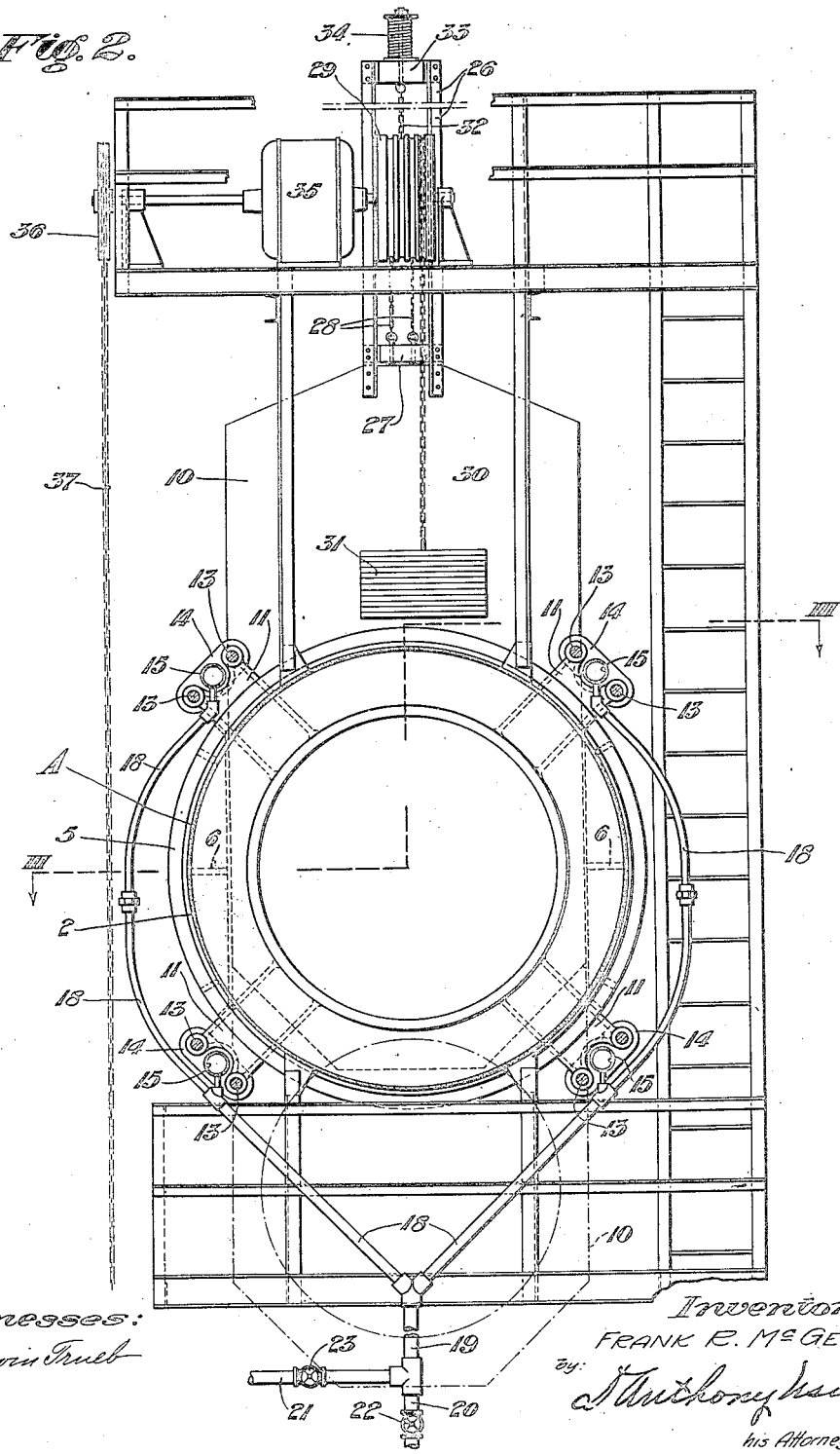

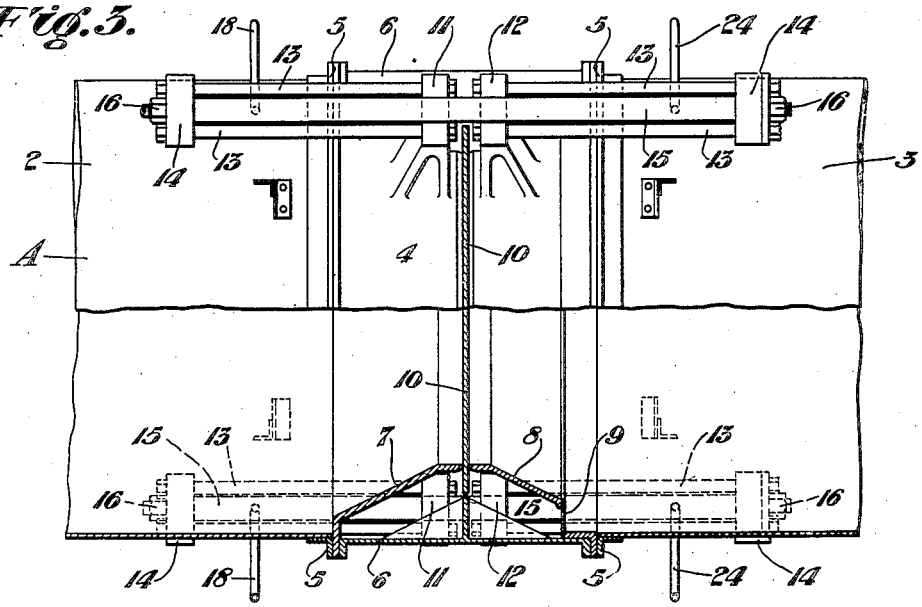
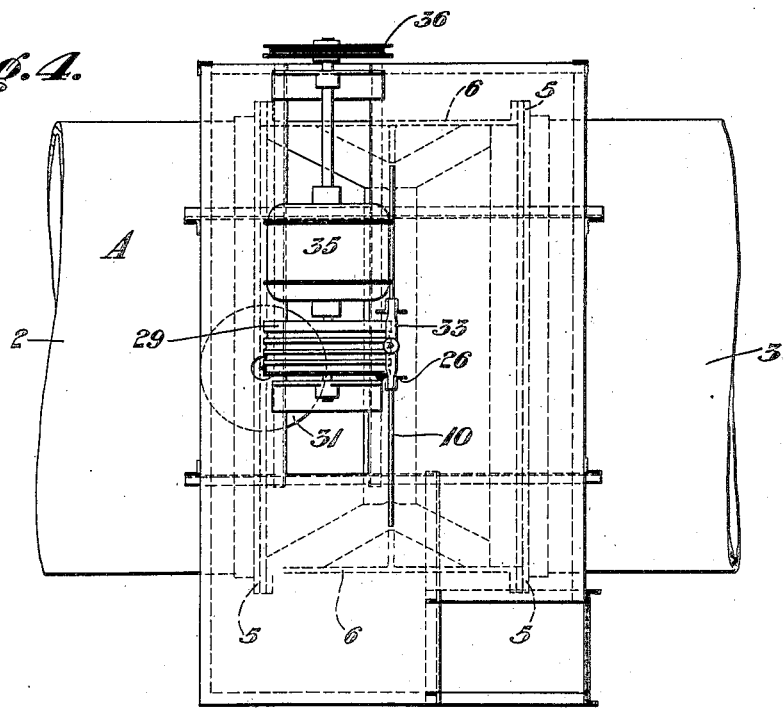

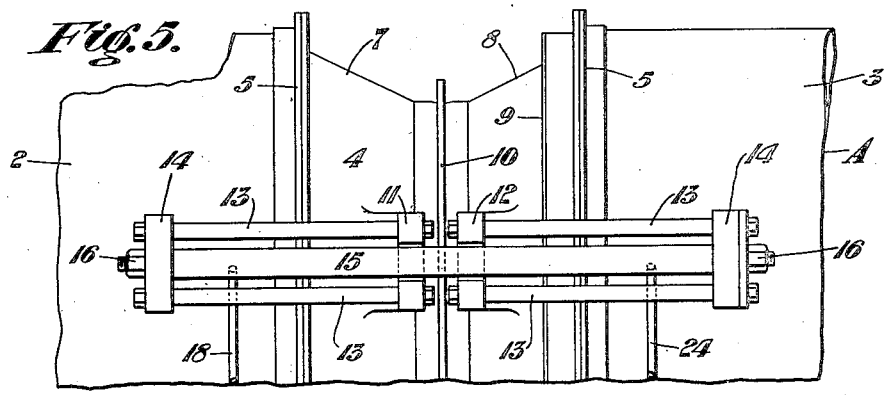
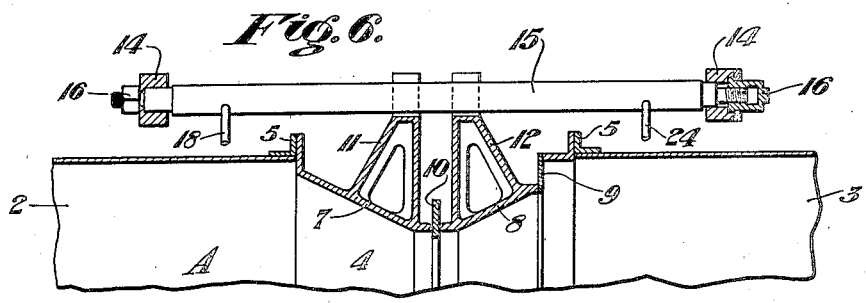
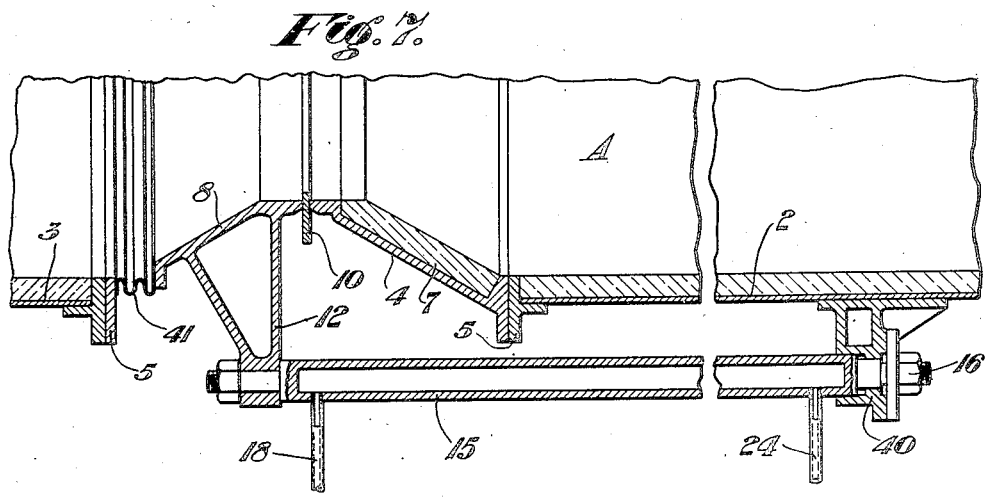

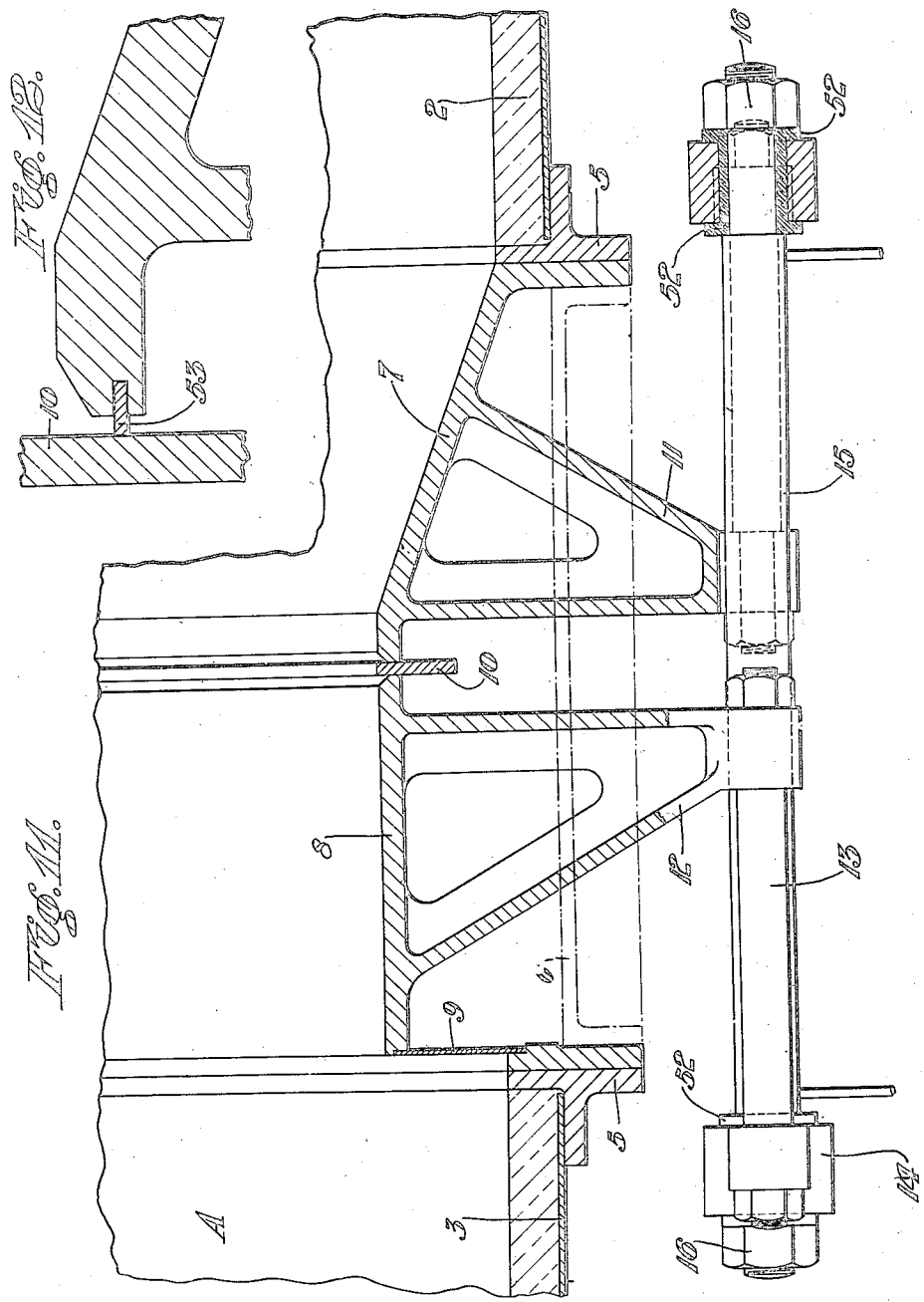

Patented Aug. 26, 1924.

1,506,021

UNITED STATES PATENT OFFICE.

FRANK R. McGEE, OF STEUBENVILLE, OHIO.

VALVE.

Application filed January 31, 1924. Serial No. 689,750.

*To all whom it may concern:*

Be it known that I, FRANK R. McGEE, a citizen of the United States, and resident of Steubenville, in the county of Jefferson and State of Ohio, have invented certain new and useful Improvements in Valves, of which the following is a specification.

This invention relates to valves and more particularly to sliding plate valves, and has for its object the provision of a novel form of valve construction, in which the valve seats, or at least one of the valve seats, are moved into sealing engagement with the valve.

Another object of this invention is to provide a novel operating mechanism for moving the valve seat or seats.

A further object is to provide a valve construction having the novel arrangement, construction and design of parts hereinafter described in detail and illustrated in the accompanying drawings.

In the drawings, Figure 1 is a side elevation of a pipe line having my improved valve mounted therein.

Figure 2 is an end elevation thereof.

Figure 3 is a transverse sectional plan on the line III—III of Figure 2.

Figure 4 is a top plan thereof.

Figures 5 and 6 are fragmentary details showing the valve seat operating mechanism.

Figure 7 is a fragmentary detail of a modified construction in which a different form of flexible mounting is shown for the movable valve seat.

Figure 8 is a fragmentary detail of a modified construction, in which both valve seats are rigid and the pipe sections are moved sufficient to release the valve.

Figures 9 and 10 are fragmentary details illustrating a still further modified embodiment of the invention, in which the pipe sections are moved bodily to release the valve.

Figure 11 is a sectional detail showing a modified embodiment of the invention, in which electric current is used for heating the thermal expansion members.

Figure 12 is a fragmentary view of one of the valve seats, showing the use of a non-corrosive metal contact strip on the seat.

Referring more particularly to the drawings, the letter A designates the pipe line, which may be composed of any number of sections secured together in any well known manner. The two sections 2 and 3, shown in the drawings, are spaced apart to form a valve-way 4. Each of the sections 2 and 3 is provided with an annular flange 5, which may be riveted, bolted, or otherwise secured to the sections. The flanged ends of the pipe sections are held in spaced relation by separator members 6.

The flange 5 on the pipe section 2 has an annular extension or valve seat member 7 rigidly secured thereto, and the flange 5 on the section 3 has an annular extension or valve seat member 8 secured thereto through a flexible web plate 9, so as to provide for movement of this seat member in a direction parallel with the longitudinal axis of the pipe.

A valve plate 10 of the goggle type is mounted between the seats 7 and 8 and is adapted to be reciprocated relative thereto.

The valve seat members 7 and 8 are provided with pull rod anchors 11 and 12, respectively, at spaced intervals and to which are fastened pairs of pull rods 13, which extend parallel to the pipe line A and away from the center line of the valve 10. The outer ends of each pair of rods 13 are connected by cross heads 14, which cross heads are connected to the opposite ends of a thermal expansion and contracting pipe member 15. While I have shown four sets of these expansion and contracting units, it will be understood that the number of units may be varied, as desired.

The purpose of these expanding and contracting units, is through thermal application, to cause the pipes 15 to lengthen or shorten as required, they being connected through cross heads 14, pull rods 13, and pull rod anchors 11 and 12, to the stationary or rigid valve seat 7 and the movable valve seat 8, thus transmitting the amount of movement equal to their longitudinal expansion or contraction to the movable seat 8, moving it toward or away from the valve plate, to form a seal with or to break the seal with the valve, according to the movement of the pipe.

Attached to the end of each pipe 15 is a nut 16, bearing against the cross head. These nuts 16 serve to adjust the relative position of the movable valve seat 8 to the pipe 15, so as to insure contact with the valve plate 10 of sufficient pressure to form an effective seal. Also, the nuts 16 provide a means of hand operation in case of failure of the thermal supply.

The thermal expansion and contracting pipes 15 are connected at one end to supply conduits 18, which are connected to a supply main 19 having branches 20 and 21 leading to sources of supply of heating and cooling mediums, respectively. Suitable valves 22 and 23 are provided in the branch mains 20 and 21, respectively, to control the flow therethrough.

The opposite or outlet ends to outlet conduits 24 connect to a single escape main 25 which leads to a sewer or other point of disposal.

The goggle plate 10 is adapted to be reciprocated by the following mechanism. Secured to the upper end of the valve plate 10 is a steel frame 26 (termed "valve plate stem") with a lifting chain cross head 27 fastened to the frame at a point slightly above the valve plate, so as to provide a clearance for adjustment of the valve lifting chains 28 which are secured to the cross head. The chains 28 extend upward and are wound on and secured to a valve operating drum 29. Also secured to and wound upon the drum 29 is a counterweight chain 30 on which is carried a valve plate counterweight 31. The counterweight 31 balances the weight of the valve plate 10, and limits the operating power required to move the valve plate to that required to overcome friction in the operating mechanism. Also secured to and wound upon valve operating drum 29 is a pull back chain 32 which extends upwardly to a pull back chain crosshead 33, and on which chain 32 is supported by a chain tension spring 34. As valve lifting chains 28, counterweight chain 30 and pull back chain 32 are all attached to a common operating drum 29, the combination with valve plate stem 26 permits of a novel compact operating mechanism, avoiding exposed gears, racks, etc., which are difficult to keep in operating condition in many locations. Valve operating drum 29 is rotated by an enclosed gear reduction set 35 or other similar mechanism shown here, operated by a hand chain sheave 36 and a hand operating chain 37. This drive, instead of being hand operated may, of course, be operated by any suitable power device.

Referring to the modified construction of Figure 7, the general construction is the same as heretofore described. The thermal expanding and contracting pipes 15, however, are fastened at one end to the pipe section 3 of the pipe line by anchor brackets 40 and adjusting nut 16. The opposite ends of the thermal pipes 15 are secured to the movable seat 8 through the anchor brackets 12. The movable seat 8 is secured to the pipe flange 5 by a corrugated expansion ring 41 instead of the flexible web plate as in the main construction. It will be readily seen that due to the one end of the pipes 15 being positively anchored on the pipe section 3 any expansion or contraction of the pipes 15 will be communicated directly to the seat 8, and thus move it toward or away from the valve.

In Figure 8 I have shown both valve seats 7 and 8 as being rigid and secured directly to the pipe sections 2 and 3, and the thermal expanding and contracting pipes 15 are secured at each end to anchors 43 on the pipe sections 2 and 3. This construction is primarily for use with pipe lines having flexible or expansible joints of any well known construction, so that expansion or contraction of the pipes 15 will move the pipe sections bodily sufficient to cause sealing and unsealing of the valve seats.

The pipe sections 2 and 3 are kept in alinement by the flexible alining plates 44, which are secured to the seat members 7 and 8 and to a separator plate 45. The separator plate 45 is provided with anchors 46 which are rigidly secured to the pipes 15.

In Figures 9 and 10 a further modified form of my invention is shown, in which the pipe sections 2 and 3 are adapted to be moved bodily. In this construction the pipe line is shown supported on a rigid column 48, which has a flexible connection through plates 49, with the pipe sections. The thermal expansion pipes 15 are secured to anchor brackets 50 on the pipe sections 2 and 3 as described for Figure 6 and serve to bodily move the pipe sections to seal and unseal the seats 7 and 8 with the valve plate 10.

The pull rods 13 are omitted from each of the constructions of Figures 7 and 8, since the pipes 15 have at least one end anchored direct to one of the pipe sections.

In Figure 11 I have shown an enlarged detail of a construction which is an exact duplication of the construction of Figures 1 to 4, with the exception that the pipe or rod 15 is equipped for heating by electric current. The pipe 15 may be of any desired shape or material suitable for expansion by electrical heating. When the pipe or rod 15 is to be heated by electricity the pipe or rod 15 must be insulated as at 52, from the cross heads 14.

In Figure 12 I have shown a detail of the upper or contact edge of one of the valve seats provided with a non-corrosive contact strip 53, which may be welded or otherwise secured to the seat, and serves to prevent adhesion by corrosion of the valve seats to the valve plate 10. It will be understood that this non-corrosive strip may be used with any of the embodiments of my invention. Also it will be understood that the thermal expansion pipes 15 of any of the embodiments of my invention, may, if desired, be adapted for heating by electricity.

While I have shown many modified embodiments of my invention, I do not wish to be limited thereto, since they are only illustrative of the many modifications of my invention, which are possible and may be made without departing from the scope of the appended claims.

I claim—

1. The combination with a pipe line, of a plate valve slidably mounted for transverse movement relative to the line, valve seats secured to the pipe line and adapted to contact with said valve, and heat operated means for forcing at least one of said valve seats toward and away from said valve.

2. The combination with a pipe line, comprising a plurality of sections, and having at least two of the sections spaced apart to form a valve-way, of a plate valve mounted for sliding movement in said valve-way, valve seats secured to each of said sections and abutting said valve, and heat operated means for forcing at least one of said valve seats toward and away from said valve.

3. The combination with a pipe line, comprising a plurality of sections, and having at least two of the sections spaced apart to form a valve-way, of a plate valve mounted for sliding movement in said valve-way, valve seats secured to each of said sections and abutting said valve, one of said valve seats being mounted rigidly on said pipe line and the other of said seats being movable relative to said pipe line, and heat operated means for forcing said movable seat toward and away from said valve.

4. The combination with a pipe line comprising a plurality of sections, and having at least two of the sections spaced apart to form a valve-way, a pair of flanges secured to each pipe section abutting said valve-way, valve seat members mounted on each of said flanges, one of said valve seats being rigid and secured directly to the flange on one pipe section and the other of said valve seats being movable and secured to a flexible web plate which is in turn secured to the flange on the other pipe section, a plate valve mounted for reciprocatory movement between said valve seats, counterweighted means for moving said valve, and heat operated means for forcing said movable valve seat toward and away from said valve plate.

5. The combination with a pipe line comprising at least two sections which are spaced apart to form a valve-way, an annular valve seat on each of said sections, a plate valve mounted for reciprocatory movement between said seats, a plurality of pull rods secured at spaced intervals to each of said seats, said pull rods extending parallel with the gas main and away from the center line of said valve, expansion members connected to said pull rods, and means for causing thermal expansion and contraction of said members to operate said rods to cause said valve seats to move toward and away from said valve as desired.

6. The combination with a pipe line comprising at least two sections which are spaced apart to form a valve-way, a valve seat rigidly secured to one of said sections, a second valve seat having a flexible mounting on the other of said sections so as to be movable relative thereto, a plate valve mounted for reciprocatory movement between said seats, a plurality of pairs of pull rods secured to said rigid valve seat, a second plurality of pairs of pull rods secured to said movable valve seat at points opposite said pull rods on said rigid seat, cross heads secured to the outer ends of each pair of pull rods, and thermally expansible members extending between the opposite pairs of pull rods adapted to operate said pull rods to cause said movable seat to move toward and away from said valve.

7. In combination with a valve seat and a valve adapted to open and close by a movement parallel to the plane of the seat of heat controlled means for moving one of said parts (valve and seat) toward or away from the other to effect a tight closure or to separate the valve from the seat to permit its lateral movement.

8. A gas main for conducting hot gases from a blast furnace to a stove having a valve and a seat, the valve moving transversely to the axis of the main to open and close it, and heat operated means for effecting a relative movement in axial direction between the valve and the seat.

9. A gas main for conducting hot gases from a blast furnace to a stove having a valve and a seat, the valve moving transversely to the axis of the main to open and close it, and heat operated means for effecting a relative movement in axial direction between the valve and the seat but referring specifically to the movement of the seat.

In testimony whereof I have hereunto set my hand.

FRANK R. McGEE.